US 9,860,143 B2

(12) United States Patent
Bissantz

(10) Patent No.: US 9,860,143 B2
(45) Date of Patent: Jan. 2, 2018

(54) SYSTEM FOR PROVIDING INFORMATION ON THE TRAFFIC ON A GROUP OF WEBSITES

(71) Applicant: Nicolas Bissantz, Nürnberg (DE)

(72) Inventor: Nicolas Bissantz, Nürnberg (DE)

(*) Notice: Subject to any disclaimer, the term of this patent is extended or adjusted under 35 U.S.C. 154(b) by 206 days.

(21) Appl. No.: 13/927,959

(22) Filed: Jun. 26, 2013

(65) Prior Publication Data
US 2015/0006709 A1    Jan. 1, 2015

(51) Int. Cl.
*G06F 15/173*  (2006.01)
*H04L 12/26*  (2006.01)
*H04L 29/08*  (2006.01)

(52) U.S. Cl.
CPC ............ *H04L 43/045* (2013.01); *H04L 67/02* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 6,393,479 | B1* | 5/2002 | Glommen et al. | 709/224 |
| 6,792,458 | B1* | 9/2004 | Muret et al. | 709/224 |
| 7,565,425 | B2* | 7/2009 | Van Vleet et al. | 709/224 |
| 8,132,095 | B2* | 3/2012 | Seolas | G06F 11/362 |
| | | | | 715/206 |
| 2008/0004035 | A1* | 1/2008 | Atkins et al. | 455/454 |
| 2012/0210200 | A1* | 8/2012 | Berger | G06F 3/04845 |
| | | | | 715/202 |
| 2013/0132484 | A1* | 5/2013 | Berezecki | 709/205 |

* cited by examiner

*Primary Examiner* — Umar Cheema
*Assistant Examiner* — John Fan
(74) *Attorney, Agent, or Firm* — Carter, DeLuca, Farrell & Schmidt, LLP

(57) ABSTRACT

A system for providing information on the traffic on a group of websites includes a screen for showing the information and a computer programmed to receive data relating to the traffic on a group of websites comprising information specifying for each visit at least the date and/or time of visit, the website and the visitor; generate for at least one visitor a data line comprising representations of the websites visited by the visitor in a time ordered arrangement; and showing the data line on the screen.

22 Claims, 2 Drawing Sheets

SYSTEM FOR PROVIDING INFORMATION ON THE TRAFFIC ON A GROUP OF WEBSITES

FIELD OF THE INVENTION

The present invention relates to a system for providing information on the traffic on a group of websites.

Companies often have a central homepage, with links to a certain number of sub-websites, relating for example to specific products or services of the company or relating to sub-divisions of the company. For the improvement of such a group of websites, it would be important to have information on the traffic on these websites.

RELATED ART

It is already known to provide websites with counters for counting the number of times that a certain website has been visited by a visitor. However, such counters only provide a very limited inside into the real use of the websites by the visitors.

BRIEF SUMMARY OF THE INVENTION

The object of the present invention is to provide a system that allows a user to monitor the traffic on a group of websites.

For this purpose, the present invention provides a system for providing information on the traffic on a group of websites, the system comprising a screen for showing the information, receiving means, generating means and displaying means. The receiving means are programmed to receive data relating to the traffic on a group of websites comprising information specifying for each visit at least the date and/or time of the visit, the website and the visitor. The generating means are programmed to generate for at least one visitor a data line comprising representations of the websites visited by the visitor in a time ordered arrangement. The displaying means are programmed to show said data line generated by the generating means on said screen.

The data line generated by the generating means and displayed by the displaying means of the present invention allows a user of the system to get a visual impression of the websites visited by a visitor one after the other, and therefore provide valuable information on the traffic on the website in a simple and easily comprehensible form. In particular, the representations of the websites visited by the visitor one after the other are displayed in the data lines next to each other in the time order of the visits.

The system of the present invention may further comprise moving means for moving the data line in correspondence with the websites visited by the visitor over a passage of time. In particular, the moving means may move the representations of the websites visited by the visitor every time the visitor visits a new website.

In a particular embodiment, the moving means will, whenever the user visits a new website, add a representation of this new website, and move the representations of the websites already displayed for creating space for the representation of the new website.

In a further embodiment, the data line may comprise an identifier for the visitor in addition to the representations of the websites visited by the visitor.

In a further embodiment, the moving means will not move the identifier of the visitor. Therefore, the identifier of the visitor will remain static, while the moving means will move the representations of the websites visited by the visitor over a passage of time.

The system of the present invention may further comprise highlighting means for highlighting the representation of a website visited at a specified time and/or date.

For example, if the system is displaying the traffic in a real time mode, the website that is at the moment visited by a visitor may be highlighted.

If the system is displaying the traffic in a film mode, the website that is visited by a visitor at the displayed moment in the film may be highlighted.

Further, in an embodiment of the system, the representation of the website visited at a specified time and/or date may be arranged at a specified location within the data line, such that representations of websites arranged to one side of this location will relate to past visits with respect to the specified time and/or date, and representations of websites arranged to the other side of this location will relate, were applicable, to future visits with respect to the specified time and/or date.

Thereby, the user of the system will easily recognize the website that is visited by a user at the specified time and/or date simply by the arrangement of the representations.

In a system as described above, the displaying means may further display the specified time and/or date. Thereby, the user will easily recognize that the representation of a website that is either highlighted by the highlighting means or arranged at the specified location is a website that is visited by a visitor at the specified time and/or date that is displayed at the same time by the displaying means.

The system may be arranged to display the traffic on the group of websites in a real time mode. In particular, the system may provide representations of the websites visited by the visitor in the past, and of the website that a visitor is visiting at the moment.

In this case, the specified time and/or date recited above is an actual time and/or date.

Alternatively or additionally, the system may be programmed to display past traffic on the group of websites. In particular, the system may be programmed to display information that has already been collected. In this case, the specified time and/or date may be a past time and/or date.

In particular, the system may display the past traffic on the group of websites in a film mode in the same manner as it would display an actual use of the groups of websites.

The system as described above may comprise adjusting means for adjusting the speed for displaying past visits. Thereby, the user can speed-up the display of the past traffic, and thereby quickly grasp the different websites visited by a user, or can have a slow-motion display of the traffic on the website.

The data lines generated by the generating means of the present invention may further comprise a time evolution line comprising representations of clicks performed by the user moving with a passage of time.

In a certain embodiment of the present invention, the representations of the websites visited by a visitor will not change or move as along as the visitor does not visit a new website. In contrast, the time evolution line will move the clicks performed by the user independently of whether the user performs new clicks or not.

For example, the time evolution line may comprise small symbols for each click that move with the passage of time. The time evolution line may be arranged next to the space where the representations of the websites visited by the visitor are displayed.

The position of the representation of the clicks on the time evolution line may be such that that clicks that happened at a specified time and/or date are always displayed at a certain position. Preferably, this position is in close spatial relationship with the representation of the website that is visited by the user at the specified time and/or date.

In a system according to such an embodiment, the representations of the websites visited by the visitor will provide the user with information on the content that a visitor has seen in a time ordered arrangement, and the time evolution line will provide the user with information on the speed with which the user has changed from one of these websites to the next.

In an embodiment of the present invention, the generating means are programmed to generate separate data lines for at least two visitors, and the displaying means will simultaneously display the separate data lines on the screen. Thereby, visual information on the traffic generated by at least two visitors is displayed simultaneously.

In a particular embodiment, the separate data lines are arranged on the screen such that representations of websites visited by the at least two visitors at the specified time and/or date are arranged in a specified manner with respect to each other. This will allow the user of the system to quickly grasp which of the representations are visited by the at least two visitors at the specified time and/or date.

In particular, the websites visited by the at least two visitors at the moment or at a displayed time and/or date are arranged in a specified manner with respect to each other.

In particular, the websites visited by the at least two visitors at a specified time and/or date are arranged at the same vertical or horizontal position. In particular, if the data lines comprise representations of the websites visited by a single visitor in a horizontal arrangement, the representations of the websites visited by the at least two visitors at the specified time and/or date may be arranged at the same horizontal position, i. e. above each other. Alternatively, if the data lines comprise the representations of the websites visited by a single visitor in a vertical arrangement, the websites visited by the at least two visitors at the specified time and/or date may be arranged at the same vertical position, i. e. side by side.

The system of the present invention may be programmed such that the data lines for all the visitors visiting a predetermined group of websites at a specified time and/or date may be displayed.

The system may also comprise selecting means for selecting a certain number of visitors whose traffic is to be displayed in separate data lines.

The system may further comprise size adjustment means for adjusting the size of the data lines in order to change the number of data lines that can be displayed simultaneously.

The system of the present invention may be programmed such that it displays information relating to the traffic on a predetermined group of websites.

In a particular embodiment, such a predetermined group of websites may comprise a main website and sub-websites of such a main website.

The system may comprise setting means for determining the group of websites that are monitored by the system.

In a particular embodiment, the displaying means of the system may display the total number of visitors at a specified time and/or date.

In an embodiment of the present invention, the representations of the websites may be screenshots of the websites. These screenshots may be displayed in the form of thumbnails, i. e. as screenshots with a strongly reduced size.

The system of the present invention may further comprise identifying means for identifying visitors on the basis of the IP addresses used by the visitors. Thereby, the system will be able to assign the entire traffic on the group of websites to separate data lines representing the traffic generated by single visitors.

In case the data lines also comprise an identifier for the visitor, the identifier may comprise information that is known on certain IP addresses. Otherwise, the identifier may be a blank identifier not providing any specific information.

DETAILED DESCRIPTION OF THE INVENTION

An embodiment of a system according to the present invention may comprise a screen for displaying information. The screen may e.g. be a computer screen of a personal computer or a laptop or a mobile device.

The system will show the traffic on a group of websites in the form of data lines 10 and 20 arranged above each other on the screen. In the embodiment shown, the data lines 10 and 20 extend horizontally. Alternatively, the data lines may also extent vertically, with several data lines being arranged next to each other.

Each data line comprises representations 11 to 13 of the websites visited by a certain visitor. The representations 11 to 13 are arranged in a time ordered manner, such that the sequence of websites shown on the screen corresponds to the sequence in which the visitor has visited the websites.

The data lines also comprise an identifier 40 identifying the visitor. The identifier may be a simple symbol if no specific information on the visitor is known. Otherwise, specific information on the visitor may be displayed. The system may comprise identifying means for identifying the different users of a website by their IP address.

Figure 1:
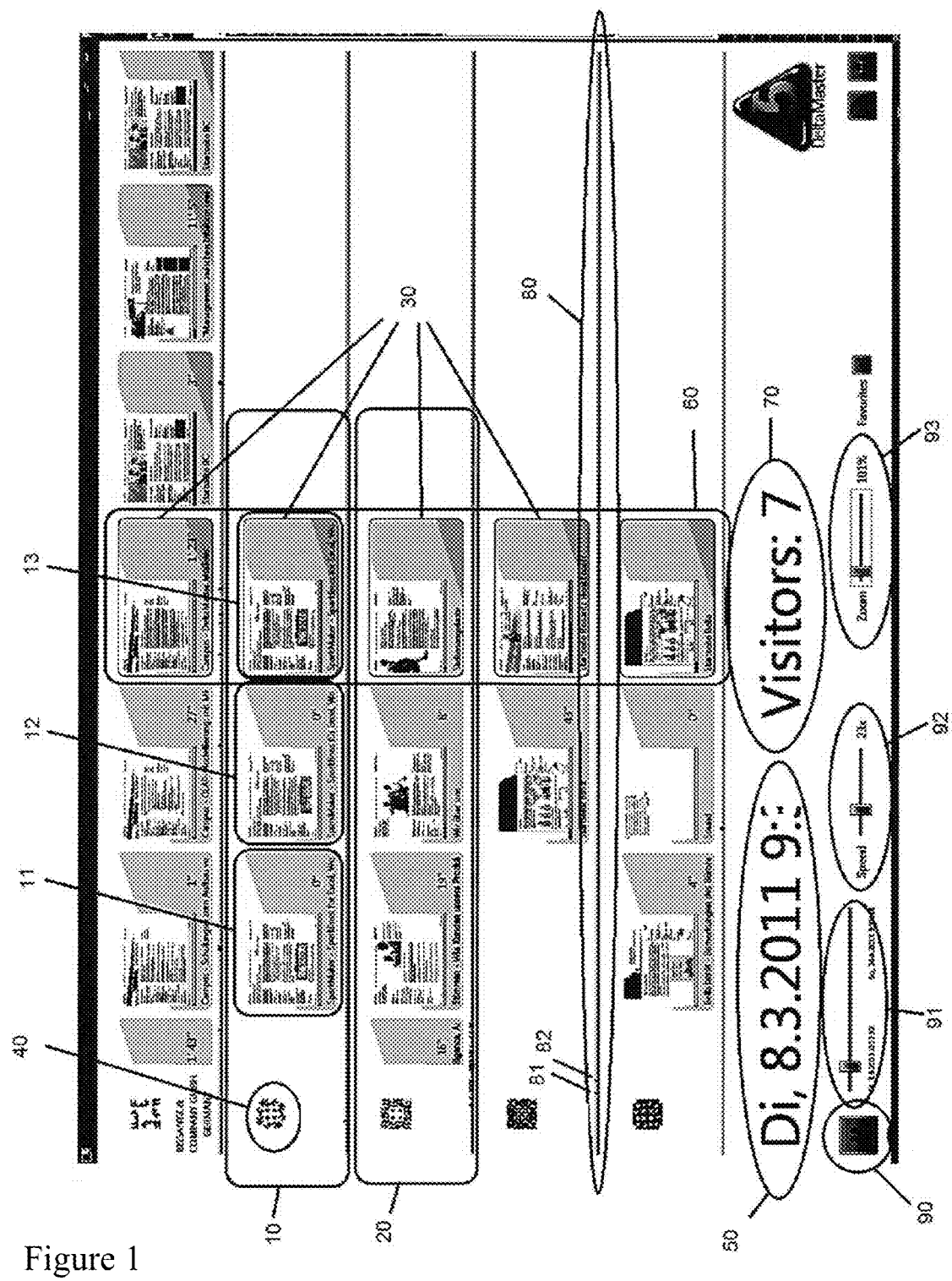
FIGS. 1 and 2 show snapshots of a computer screen of an embodiment of the system according to the present invention. Both figures show the invention in the form of data lines which are located in a frame or window opening on the screen of a computer device.

In the embodiment shown in FIG. 1, the identifiers 40 of the visitors in the data lines 10 and 20 are static. In contrast, the representations 11 to 13 of the websites will move with each new website that a visitor is visiting.

Figure 2:
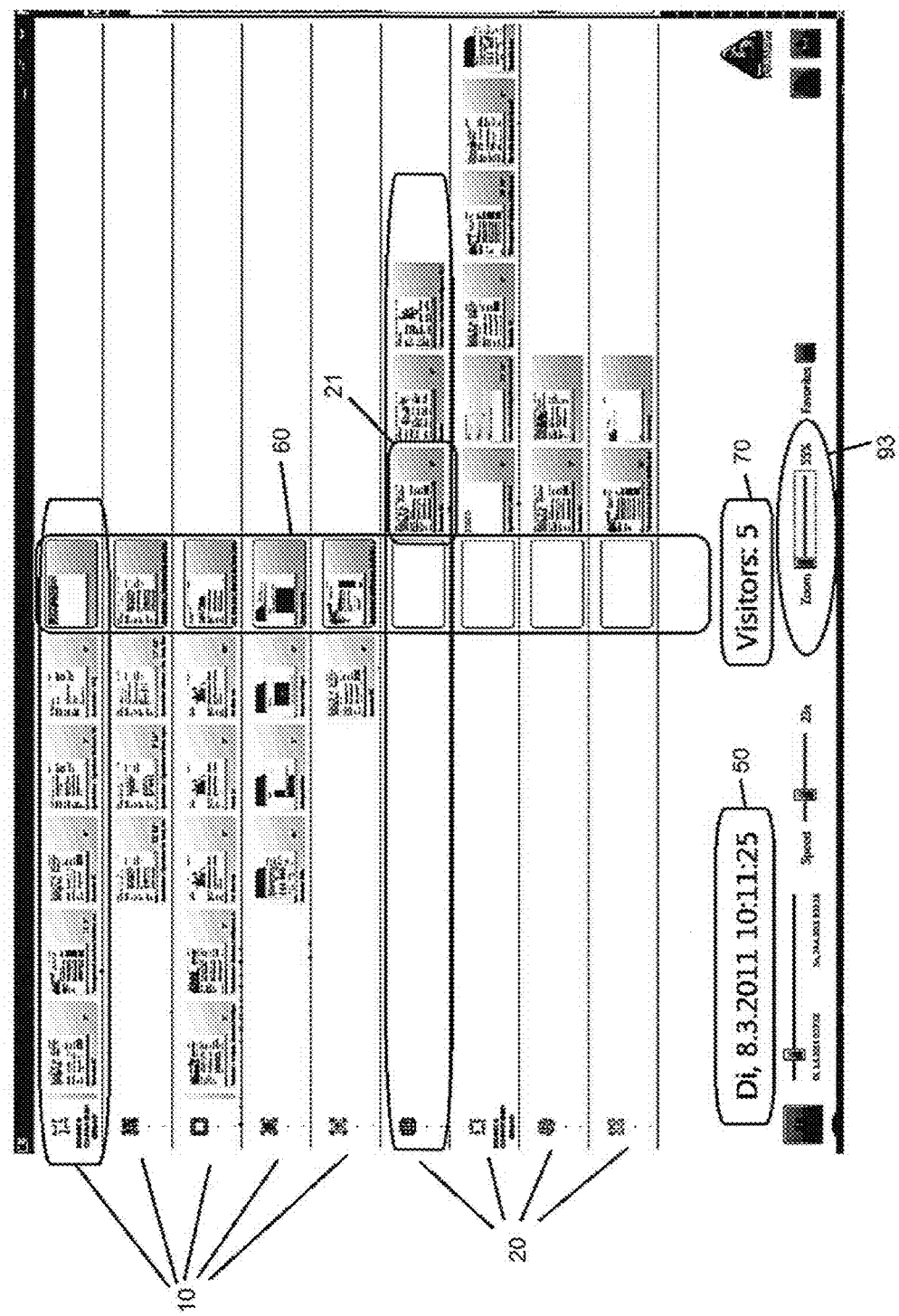

The embodiment shown in FIGS. 1 and 2 is programmed to display the past traffic that occurred on a website. For this purpose, the system comprises data storage means storing for a specified time frame information specifying for each visit at least the date and/or time of the visit, the website and the visitor. The generating means will generate from these data visual representations of the traffic in the form of the data lines 10 and 20.

The system of the present invention will display the past traffic as a film, with the representations of the websites changing with the running of the time. The movement can be stopped and started with a button 90.

There is a further display section 50 showing the time and date that is currently displayed in the film sequence of the websites.

In the data lines 10 and 20, the representations of the websites visited by the visitors at this specified time and date is highlighted by a highlighting frame 30. Further, all the websites visited at this specified time by all the users are arranged at the same horizontal position 60 on the screen.

Thereby, at the horizontal position 60, representations of the websites seen by the different users at the specified time and date shown in the display element 50 are shown. For the data line 10, this is the representation 13.

Representations of websites visited by the visitors before the specified time and date are displayed on the right hand side of the position 60. Websites that will be visited by a visitor after the specified time and date are shown on the left hand side of the position 60. For the data line 10, these are the websites 11 and 12.

Whenever a visitor visits a new website, the representations in the data line representing the traffic due to this visitor will be moved one step to the right hand side, such that the new website that is visited by the visitor is at location 60.

The system comprises adjusting means 92 for adjusting the speed with which the past traffic is displayed. For example, in the embodiment shown in FIG. 1, the speed with which the websites change is twenty-three-times the real speed. This speed can be changed by moving an adjustment button on the speed adjustment line.

Further, the display section 91 displays a time line representing the entire time section that is displayed, with a button at the position of the specified time and date. By moving this button, the user can quickly move to different parts within the entire film.

Each data line 10 and 20 also comprises a time evolution line 80. In the embodiment, this time evolution line is arranged below the representations of the websites.

In the time evolution lines, small representations 81 and 82 of the clicks performed by a user will move from left to right with the passage of time. While the representations of the websites provide any information on how long a visitor stayed on the websites, the representations 81 and 82 of the clicks that the visitor performed for switching between these websites will move with a specified speed with respect to the passage of time, and therefore give a visual impression of the time that a user stays on a certain website.

In the embodiment, the movement of the representations 81 and 82 of the clicks, i. e. of the switching between one website and another website, is synchronized with the movement of the representations of these websites in such a way that clicks occurring at the specified time displayed in display section 50 will be represented at the position 60, as well. Therefore, representations such as representations 81 and 82 located at the left hand side of position 60 will represent future clicks, while representations of clicks on the right hand side of position 60 will relate to past clicks.

The distance between the representations 81 and 82 therefore is an indication of the time span between the respective clicks.

The display of the system shown in FIGS. 1 and 2 further comprises a display section 70 for showing the total number of visitors of the specified group of websites that is monitored by the system.

Further, there is a zooming means 93 for changing the size of the data lines and thereby for changing the number of data lines that can be shown simultaneously on the screen.

In FIG. 1, the zooming means 93 are adjusted such that five data lines can be shown above each other on the screen. In contrast, in FIG. 2, the zooming means 93 are arranged such that ten data lines can be shown above each other.

In FIG. 2, the total number of visitors to the group of websites is five at the time displayed in display section 50, as indicated in display section 70. The traffic generated by these five users is displayed in the first five data lines 10 displayed on the screen. Preferably, the system automatically moves data lines 20 displaying users that no longer visit the website at the specified time 50 below data lines 20 displaying users that still visit the website at the specified time 50.

The remaining data lines 20 display users that no longer visit the website at the specified time 50. Therefore, these data lines only comprise representations 21 of websites that have been used by these users in the past. The position 60 and the positions left to this position are left blank, to indicate that there are no future uses.

In contrast, in the visitor whose traffic is represented in the data line 10 in FIG. 2 just started to visit the group of websites, such that this data line only comprises a representation of the website visited at the time and date displayed in display section 50 at the position 60, and left to this position 60 representations of future websites to be visited by this visitor.

The system according to the present invention can also be used for the real time monitoring of the traffic on a group of websites. In this case, the display section 50 simply displays the actual time and date, and the websites that are visited by the visitors at the moment are displayed at position 60. Thereby, if a user clicks on a new website, this website will appear at position 60, and move the existing representations of websites to the right hand side.

The embodiment shown in FIGS. 1 and 2 could also be implemented with a different arrangement and orientation of the data lines and their movement on the screen. For example, data lines could move from right to left with the passage of time, with future uses arranged on the right hand side of position 60 and past uses on the left hand side.

Further, the data lines could also extend in the vertical direction and move up or down or up or down with the passage of time.

What is claimed is:

1. A system for providing information on traffic on a group of webpages, the system comprising:
   a screen for showing the information;
   a processor; and
   a memory storing instructions, which, when executed by the processor, cause the system to:
      receive and analyze data relating to the traffic on a group of webpages including information specifying for each visit at least a date and/or time of visit, the webpage, and a user;
      detect a first plurality of webpages, of a group of webpages, accessed by a first computing device in response to respective first user commands to navigate a first web browser running on the first computing device to the first plurality of webpages, the first plurality of webpages including a first webpage being accessed at a point in time;
      detect a second plurality of webpages, of the group of webpages, accessed by a second computing device in response to respective second user commands to navigate a second web browser running on the second computing device to the second plurality of webpages, the second plurality of webpages including a second webpage accessed at the point in time, the second webpage being different from the first webpage;
      generate, for the first user, a first plurality of images of webpages corresponding to respective webpages of the first plurality of webpages accessed by the first computing device, the first plurality of images of webpages being in a time ordered arrangement based on the analyzed data;

generate, for the second user, a second plurality of images of webpages corresponding to respective webpages of the second plurality of webpages accessed by the second computing device, the second plurality of images of webpages being in a time-ordered arrangement based on the analyzed data;

simultaneously display the first plurality of images of webpages visited by the first user in time order in a first horizontal line and the second plurality of images of webpages visited by the second user in time order in a second horizontal line disposed below the first horizontal line on the screen;

highlight a first image of the first plurality of images of webpages visited by the first user, the first image corresponding to a first webpage visited by the first user at a specified time and/or date, and a second image of the second plurality of images of webpages visited by the second user, the second image corresponding to a second webpage visited by the second user at a same specified time and/or date;

determine whether a user visits a webpage different from a previously-visited webpage;

generate a different image of the different webpage when it is determined that the user visits a webpage different from a previously-visited webpage;

move the displayed plurality of images of webpages visited by the user in a predetermined direction along a line; and add the different image to one end of the displayed plurality of images of webpages visited by the user.

2. The system according to claim 1, wherein the instructions, when executed by the processor, further cause the system to move the displayed plurality of images of webpages visited by the user over a passage of time.

3. The system according to claim 1, wherein the instructions, when executed by the processor, further cause the system to display an identifier for each of the first and second users.

4. The system according to claim 3, wherein the moving will not move the identifier for each of the first and second users.

5. The system according to claim 1, wherein the instructions, when executed by the processor, further cause the system to place a highlighting frame around the first image and the second image.

6. The system according to claim 1, wherein an image of the plurality of images of webpages visited at a specified time and/or date is arranged at a specified location within the line of the plurality of images of webpages, such that images of webpages arranged to one side of the specified location will relate to past visits with respect to the specified time and/or date and images of webpages arranged to the other side of the specified location will relate, where applicable, to future visits with respect to the specified time and/or date.

7. The system according to claim 5, wherein the instructions, when executed by the processor, further cause the system to display the specified time and/or date.

8. The system according to claim 1, wherein the displaying is performed in a real-time mode.

9. The system according to claim 8, wherein the specified time and/or date is an actual time and/or date.

10. The system according to claim 1, wherein the webpages include webpages for past visits.

11. The system according to claim 10, wherein the specified time and/or date is a past time and/or date.

12. The system according to claim 11, wherein the instructions, when executed by the processor, further cause the system to adjust a speed for displaying the webpages for the past visits.

13. The system according to claim 1, wherein the instructions, when executed by the processor, further cause the system to display a time evolution line including representations of clicks performed by the user moving with a passage of time.

14. The system according to claim 1, wherein the plurality of images of webpages visited by the first and second users at a specified time and/or date are arranged in a specified manner with respect to each other.

15. The system according to claim 14, wherein the plurality of images of webpages visited by the first and second users at a specified time and/or date are arranged at a same vertical position.

16. The system according to claim 1, wherein the displaying includes displaying the lines of the plurality of images of webpages for all users visiting a predetermined group of webpages at a specified time and/or date.

17. The system according to claim 1, wherein the instructions, when executed by the processor, further cause the system to adjust a size of the plurality of images of webpages in order to change a number of lines of the plurality of images of webpages that can be displayed simultaneously.

18. The system according to claim 1, wherein the instructions, when executed by the processor, further cause the system to display information relating to traffic on a predetermined group of webpages.

19. The system according to claim 18, wherein the predetermined group of webpages includes a main webpage and sub-webpages of the main webpage.

20. The system according to claim 1, wherein the instructions, when executed by the processor, further cause the system to display a total number of users at a specified time and/or date.

21. The system according to claim 1, wherein the plurality of images of webpages are screenshots of webpages.

22. The system according to claim 1, wherein the instructions, when executed by the processor, further cause the system to identify users on the basis of IP-addresses used by the users.

* * * * *